United States Patent [19]

Dick

[11] 3,745,573

[45] July 10, 1973

[54] PROXIMITY FUZE CIRCUIT

[75] Inventor: John O. Dick, Riverside, Calif.

[73] Assignee: The United States of America as represented by the Secretary of the Navy, Washington, D.C.

[22] Filed: Sept. 24, 1963

[21] Appl. No.: 311,260

Related U.S. Application Data

[63] Continuation-in-part of Ser. No. 56,612, Sept. 16, 1960, abandoned.

[52] U.S. Cl. .......... 343/7 PF, 102/70.2 P

[51] Int. Cl. .......... F42c 13/04, G01s 9/24

[58] Field of Search .......... 343/7, 8, 9, 14, 343/7 P F; 102/70.2 P

[56] References Cited

UNITED STATES PATENTS 3,614,783 10/1971 Adrian .......... 343/7 PF

*Primary Examiner*—T. H. Tubbesing

*Attorney*—Q. Baxter Warner, J. M. St. Amand and T. M. Phillips

EXEMPLARY CLAIM

1. In a proximity fuze system the combination comprising, a. transmitting circuit means including an oscillator for transmitting a frequency modulated wave of high frequency energy, b. receiving circuit means including a balanced mixer for receiving said transmitted energy when reflected from a target, c. said balanced mixer being coupled to said oscillator for producing an output which is the difference in frequency of said transmitted signal and said received signal, d. amplifier means coupled to said mixer for amplifying said mixer output, e. a biased diode low level detector means coupled to said amplifier for detecting the doppler signal from said mixer, f. envelope detecting means coupled to the output of said low level detector means for masking background signals over a wide dynamic range present in said reflected energy, g. and signal processing circuit means coupled to said envelope detecting means for utilizing said doppler signal.

4 Claims, 1 Drawing Figure

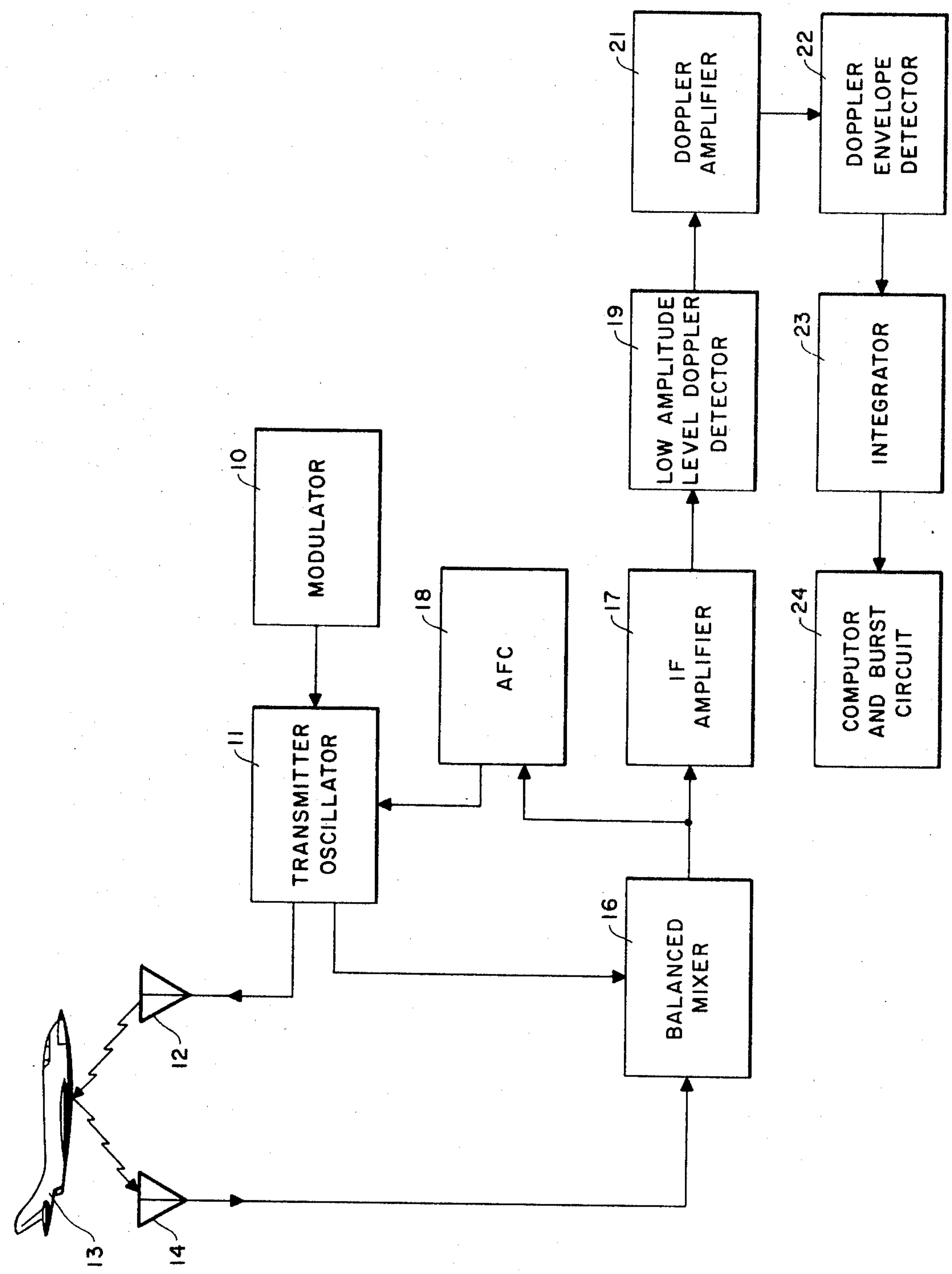
JOHN O. DICK
*INVENTOR.*
BY [signature] [signature]
*ATTORNEYS*

PROXIMITY FUZE CIRCUIT

This is a continuation-in-part of U. S. Pat. Application Ser. No. 56,612 filed September 16, 1960, now abandoned.

The invention herein described may be manufactured and used by or for the Government of the United States of America for governmental purposes without the payment of any royalties thereon or therefor.

The present invention relates to a proximity fuze circuit and more particularly to a proximity fuze circuit utilizing low level detection of the intermediate frequency signal.

In known proximity fuze circuits of this type a frequency modulated wave is emitted which is reflected by a target. The reflected wave is heterodyned with the local oscillator signal to produce the difference frequencies of the local oscillator signal and the reflected signal. This circuit was considered to have high sensitivity because of the superheterodyned action.

An object of the present invention is the provision of a proximity fuze circuit which has improved sensitivity over known circuits.

Another object is to provide a proximity fuze circuit which has improved dynamic signal range over present transistorized and vacuum tube fuze systems.

A further object is the provision of a proximity fuze circuit which overcomes the blanking of useful signals by broad signals obtained from ground or sea return.

Other objects and many of the attendant advantages of this invention will become readily appreciated as the same becomes better understood by reference to the following detailed description when considered in connection with the accompanying drawings wherein:

There is shown in the single FIGURE a block diagram of a fuze circuit embodying the invention. Transmitting oscillator 11, which may be any type of power oscillator, is coupled to transmitting antenna 12 for transmitting a modulated signal to target 13. Modulator 10 is coupled to transmitting oscillator 11 for modulating the output signal fed to antenna 12. Receiving antenna 14 is coupled as an input to balanced mixer 16 which has a lead coupled from oscillator 11 as a second input. The output from balanced mixer 16 is coupled to IF amplifier 17 and to automatic frequency control circuit 18. The output of automatic frequency control circuit 18 is coupled to oscillator 11. A low level detector 19 is coupled to the output of amplifier 17. The output signal from detector 19 is processed through doppler amplifier 21, envelope detector 22, integrator 23 and firing circuit 24.

In operation modulator 10 generates a modulating wave at a frequency of several hundred kilocycles to frequency modulate oscillator 11 which furnishes both a target illumination signal for target 13 and a local oscillator signal to balanced mixer 16. The local oscillator portion of the transmitted signal is mixed in mixer 16 with the signal reflected from target 13. The reflected signal is identical to the local oscillator signal except for the addition of the doppler frequency produced by relative motion between the transmitter and the target 13. The heterodyne action of mixer 16 produces sum and difference frequencies of the local oscillator signal and the reflected signal. The sum frequencies are filtered out by mixer 16 and the difference frequencies only appear at the mixer output. Automatic frequency control circuit 18 (known in the fuze art as servo amplifier) may comprise an amplifier tuned to amplify any error-voltage signal developed by a deviation from the operating frequency sufficiently to maintain oscillator 11 at the center of its operating mode. Mode-center operation is necessary in order to minimize amplitude modulation of the carrier and to keep the r-f power output at a maximum.

The gain of intermediate frequency amplifier 17 is limited to 72 db maximum (as compared to 88 to 100 db in known systems) to permit a wide dynamic range in amplifier 17. The limiting of the gain of amplifier 17 is done to prevent saturation. The output of amplifier 17 is then detected in a low level detector 19 (which may be a biased silicon diode) capable of linear detection at signal levels as low as three millivolts RMS (as compared to approximately two volts RMS in known systems) as well as at normal or high signal levels. The signal appearing at the input of detector 19 is the carrier signal amplitude modulated by the doppler effect caused by the transmitted signal being reflected from a moving target. The output signal from detector 19 is the doppler intercept signal and any background noise which may be present; the carrier signal was removed by detector 19. Doppler amplifier 21 which should be a wide band video amplifier, amplifies the doppler signal input sufficiently to insure reliable operation of doppler envelope detector 22. Detector 22 may be a peak-to-peak detector or voltage doubler circuit. The output of detector 22 is a rippled envelope of the doppler signal input. Integrator 23 should have a time constant so that all trace of the ripple appearing on the output of detector 22, leaving only the envelope of the desired intercept signal. For maximum usefulness of the above described circuit it is necessary that saturation be prevented in IF amplifier 17. Integrator 23 produces an output pulse which is used to initiate firing of a time delay computer 24 suitable to the application. AC coupling is used throughout to eliminate the effects of any residual or slowly varying signal so that the system will function properly upon receiving an intercept signal even in the presence of a high level of ground or sea return signal. High pass coupling is used throughout the system to reject low frequency signals.

Obviously many modifications and variations of the present invention are possible in the light of the above teachings. It is therefore to be understood that within the scope of the appended claims the invention may be practiced otherwise than as specifically described.

What is claimed is:

1. In a proximity fuze system the combination comprising, a. transmitting circuit means including an oscillator for transmitting a frequency modulated wave of high frequency energy, b. receiving circuit means including a balanced mixer for receiving said transmitted energy when reflected from a target, c. said balanced mixer being coupled to said oscillator for producing an output which is the difference in frequency of said transmitted signal and said received signal, d. amplifier means coupled to said mixer for amplifying said mixer output, e. a biased diode low level detector means coupled to said amplifier for detecting the doppler signal from said mixer, f. envelope detecting means coupled to the output of said low level detector means for masking background signals over a wide dynamic range present in said reflected energy, g. and signal processing circuit means coupled to said envelope detecting means for utilizing said doppler signal.

2. In a proximity fuze system the combination comprising, a. transmitting circuit means including an oscillator for transmitting a frequency modulated wave of high frequency energy, b. receiving circuit means including a balanced mixer for receiving said transmitted energy when reflected from a target, c. said balanced mixer being coupled to said oscillator for producing an output which is the difference in frequency of said transmitted signal and said received signal, d. amplifier means coupled to said mixer for amplifying said mixer output, e. a biased diode detector means capable of linear detection at signal levels as low as three millivolts RMS coupled to said amplifier for detecting the doppler signal from said mixer, f. envelope detecting means coupled to the output of said low level detector means for masking background signals over a wide dynamic range present in said reflected energy, g. said signal processing circuit means coupled to said envelope detecting means for utilizing said doppler signal.

3. In a proximity fuze system the combination comprising, a. transmitting circuit means including an oscillator for transmitting a frequency modulated wave of high frequency energy, b. receiving circuit means including a balanced mixer for receiving said transmitted energy when reflected from a target, c. said balanced mixer being coupled to said oscillator for producing an output which is the difference in frequency of said transmitted signal and said received signal, d. amplifier means coupled to said mixer for amplifying said mixer output, e. a biased silicon diode biased in the linear operating range coupled to said amplifier for detecting the doppler signal from said mixer, f. envelope detecting means coupled to the output of said low level detector means for masking background signals over a wide dynamic range present in said reflected energy, g. and signal processing circuit means coupled to said envelope detecting means for utilizing said doppler signal.

4. In a proximity fuze system the combination comprising, a. transmitting circuit means including an oscillator for transmitting a frequency modulated wave of high frequency energy, b. receiving circuit means including a balanced mixer for receiving said transmitted energy when reflected from a target, c. said balanced mixer being coupled to said oscillator for producing an output which is the difference in frequency of said transmitted signal and said receiving signal, d. amplifier means coupled to said mixer for amplifying said mixer output, e. a biased silicon diode capable of linear detection at signal levels as low as three millivolts RMS coupled to said amplifier for detecting the doppler signal from said mixer, f. envelope detecting means coupled to the output of said low level detector means for masking background signals over a wide dynamic range present in said reflected energy, g. and signal processing circuit means coupled to said envelope detecting means for utilizing said doppler signal.

* * * * *